Oct. 7, 1924.　　　　　　　　　　　　　　　　　　1,510,502
H. ROTH
PHOTOGRAPH DISPLAY CABINET
Filed July 21, 1923　　　　3 Sheets-Sheet 1
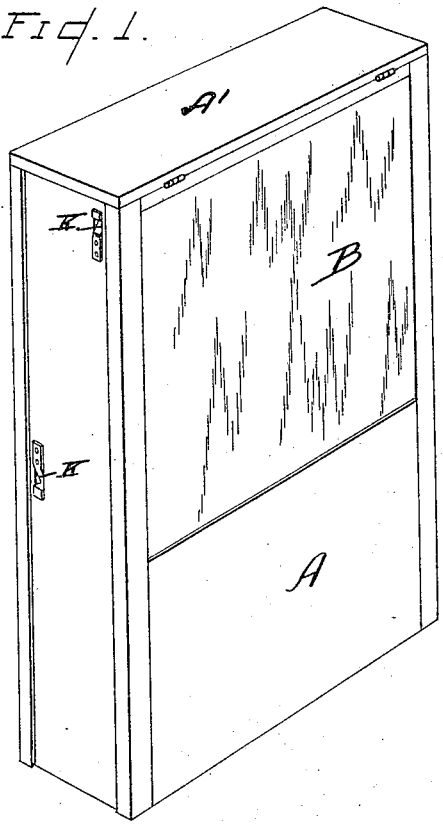
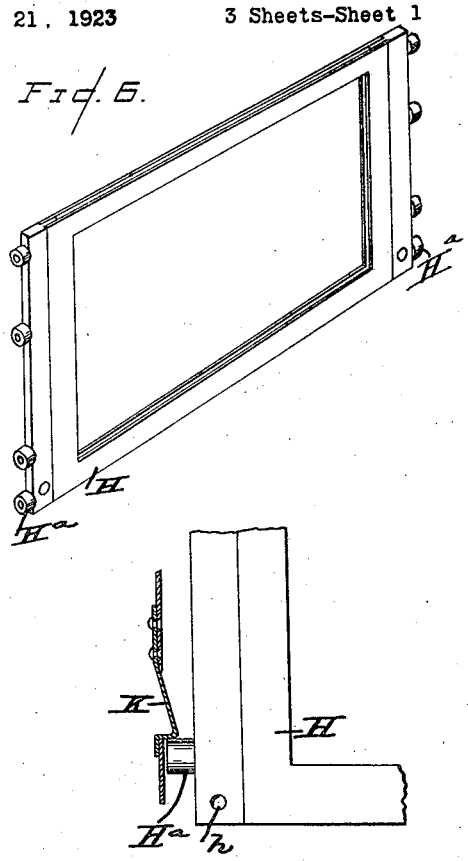
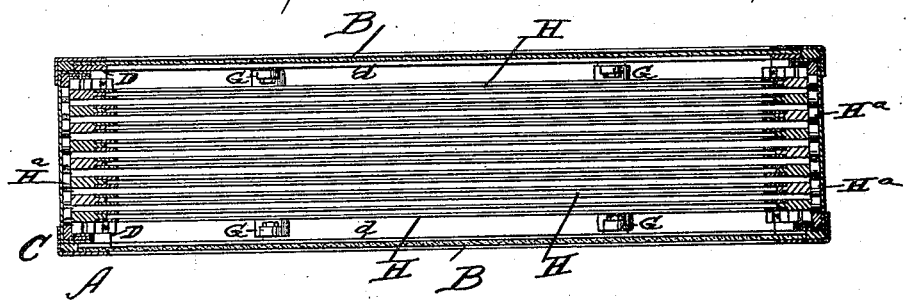
Inventor
Harry Roth
By J. E. Thomas, Attorney

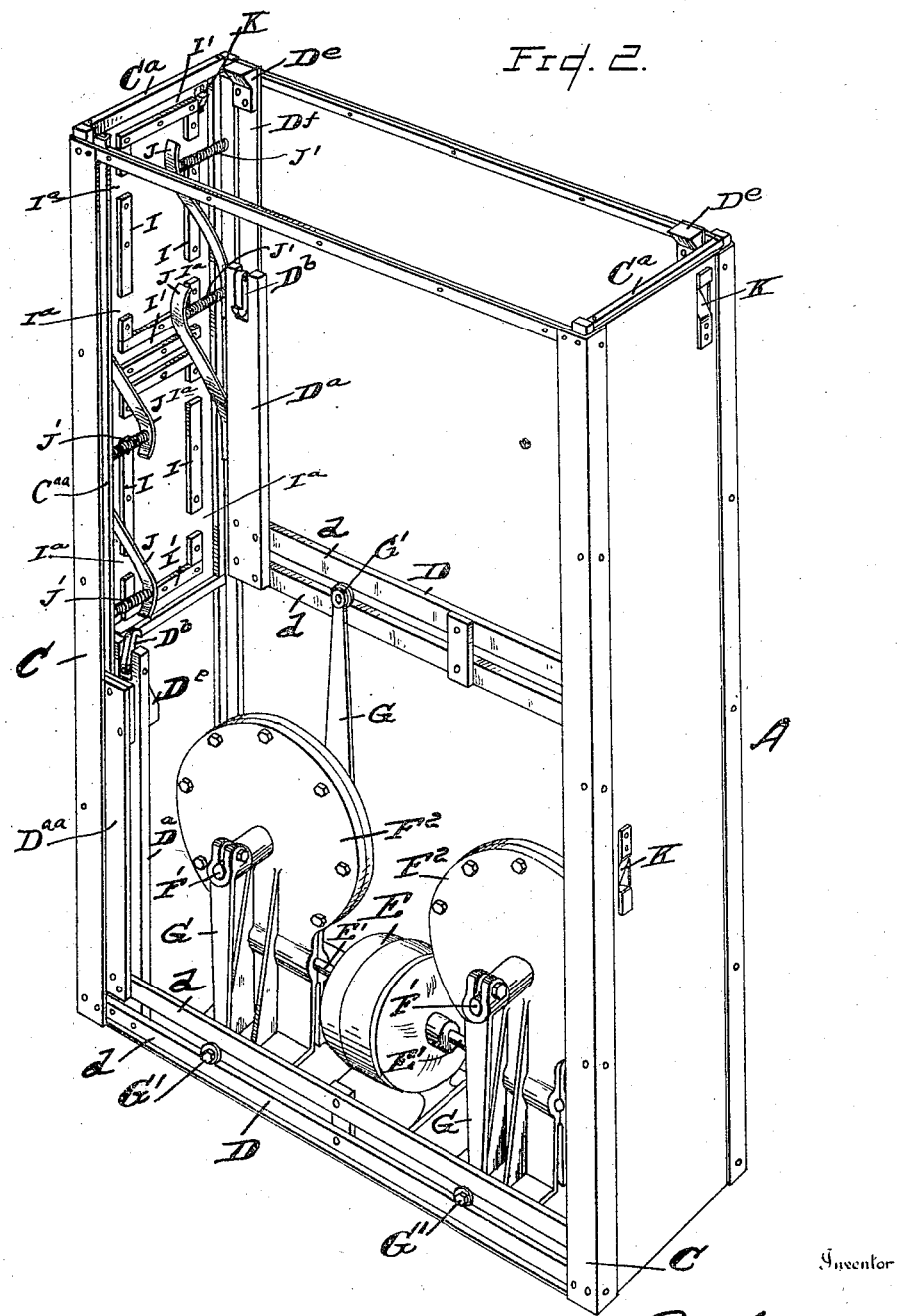

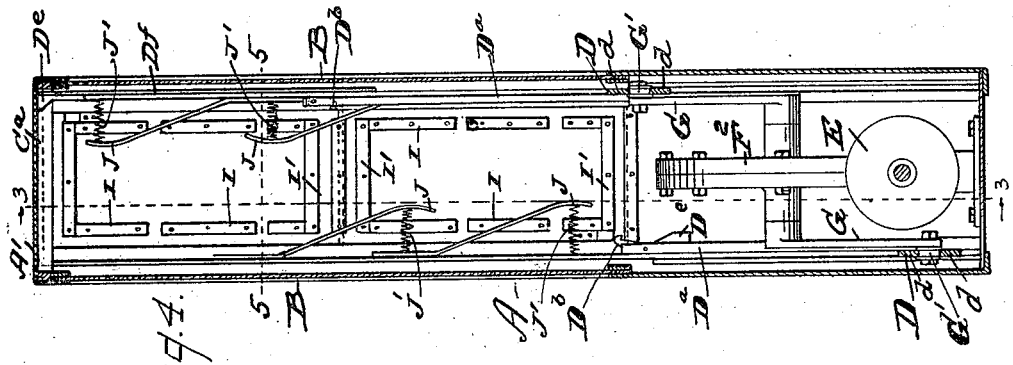
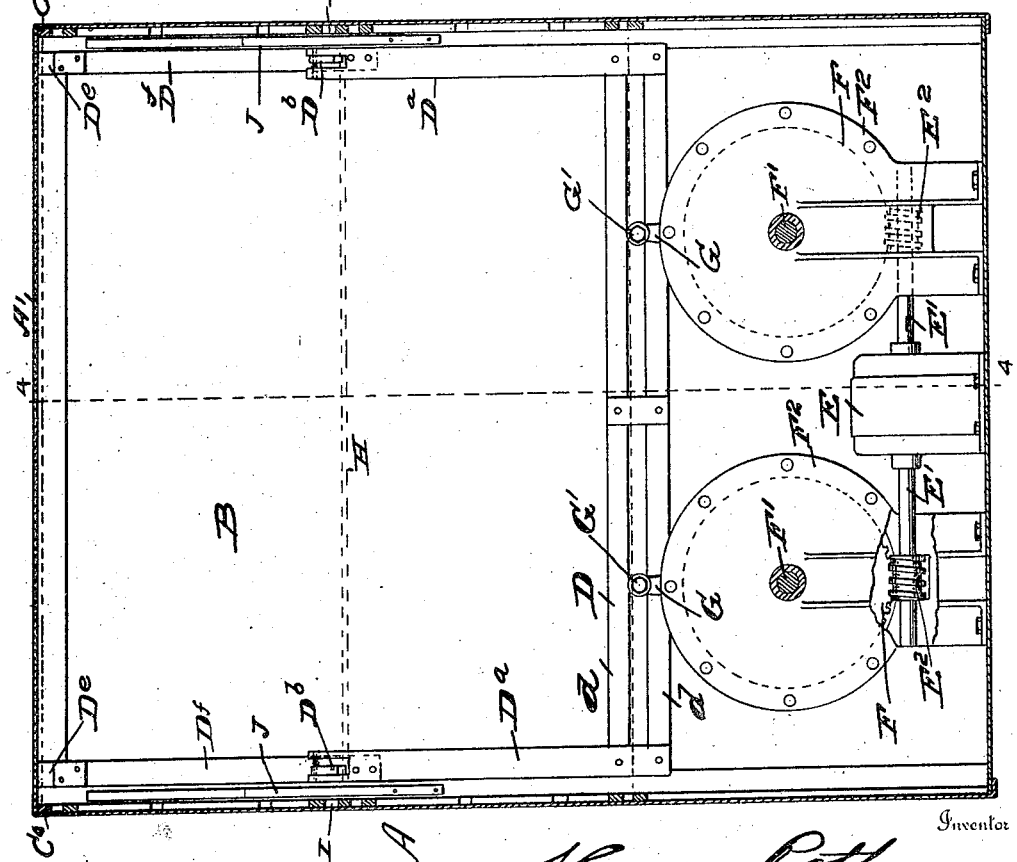

Patented Oct. 7, 1924.

1,510,502

UNITED STATES PATENT OFFICE.

HARRY ROTH, OF DETROIT, MICHIGAN.

PHOTOGRAPH-DISPLAY CABINET.

Application filed July 21, 1923. Serial No. 652,870.

*To all whom it may concern:*

Be it known that I, HARRY ROTH, a citizen of Russia, residing at Detroit, county of Wayne, State of Michigan, have invented a certain new and useful Improvement in Photograph-Display Cabinets, and declare the following to be a full, clear, and exact description of the same, such as will enable others skilled in the art to which it pertains to make and use the same, reference being had to the accompanying drawings, which form a part of this specification.

My invention relates to a display cabinet for photographs, advertising matter, or the like, designed as an improvement on the device patented to me April 10th, 1923, No. 1,451,029.

The object of this invention is to provide a cabinet adapted to house a plurality of movable frames containing a series of photographs or advertising cards adapted to be consecutively presented to view through window openings on each side of the cabinet by operative means contained within the enclosing walls of the cabinet.

A further object of the invention is to provide relatively large unobstructed window spaces on each side of the cabinet through which the photographs or advertising cards may be readily displayed.

A further object of the invention is to provide means, actuated by a motor contained within the cabinet, for positively engaging the respective frames, whereby the several frames may be successively brought into view in front of the window spaces on each side of the cabinet and which are subsequently forced out of view that other pictures or advertisements may take their places.

A further object of the invention is to provide means for momentarily locking the frames when properly positioned in front of the windows that the photograph or advertising display frames may not be accidentally shifted so that they will not properly display the picture, or advertising matter, due to movement of the frames.

A further object of the invention is to provide for readily changing any photographs or cards without removing the remaining photographs or cards,—the construction being such that a clear unobstructed view is obtained of the photographs or cards when brought in position to be viewed through the windows.

A further object of the invention is to provide positive means for forcing the respective frames from one side of the cabinet in successive order toward the other side of the cabinet where they are engaged by vertically movable engaging means adapted to shift them into view in front of the window opening and to afterwards remove them from the window opening so that another picture or card next in order may be displayed;—the one just removed being forced toward the opposite side of the cabinet to be displayed through the window opening on that side of the cabinet when the frame is brought adjacent thereto in the due operation of the device.

The device may be employed in homes for displaying family portraits or it may be employed to advantage in photograph galleries as a means of displaying samples of photographic work or for general advertising purposes in store windows, as may be desired.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a perspective view of the cabinet.

Figure 2 is a perspective view of the device removed from its enclosing case.

Figure 3 is a vertical longitudinal sectional view of the device taken on or about line 3—3 of Figure 4.

Figure 4 is a vertical cross-sectional view taken on or about line 4—4 of Figure 3.

Figure 5 is a horizontal sectional view taken on or about line 5—5 of Figure 4, showing the movable photograph supporting frames in position.

Figure 6 is a perspective view of one of the frames.

Figure 7 is a fragmentary cross-sectional view through the wall of the case showing the spring latch secured to the case to engage a roller of one of the movable frames; —a fragment of which is shown;— to secure the frame against accidental movement when properly positioned in front of the window opening.

Referring now to the letters of reference placed upon the drawings:

A, denotes a cabinet preferably formed of sheet metal, provided with windows B, B, respectively located on opposite sides thereof,—through which photographs or advertising cards mounted in movable frames actuated by a motor housed within the cabinet, are successively brought to view.

C, indicates a rectangular frame carrying the walls of the cabinet, adapted to support vertically movable frames D, D, slidable in guide-ways $C^{aa}$ forming part of the side members of the frame.

$C^a$, designates cross-members secured to the top of the frame on each side thereof, which are removed to insert a plurality of removable frames carrying photographs or advertising cards;—the cross-members to be again secured in place when the removable frames are installed.

E, denotes an electric motor or other prime mover fitted with a driving shaft $E^1$ on which are mounted worm gears $E^2$ in mesh with gears F mounted on shafts $F^1 F^1$ journaled in gear cases $F^2 F^2$.

G, G, indicate crank-arms respectively mounted upon the shafts $F^1$ having crank-pins $G^1 G^1$ projecting through the spaced horizontal members $d$, $d$, of the vertically movable frames D, whereby the latter are alternately moved in opposite directions through the operation of the motor.

Secured to the horizontal members $d$, $d$, of the vertically movable frame are upright elements $D^a$, in which are journaled spring actuated dogs $D^b$, which are respectively adapted to enter suitable apertures $h$, provided in each of a plurality of removable frames H,—adapted to support photographs, advertising matter, or like;—a pair of photographs or advertising cards being inserted back to back in each frame. The photographs or advertising card frames are each provided with a plurality of guide rolls $H^a$ projecting from opposite sides of the frame to guide the frame along suitable vertical and horizontal guide-ways I and $I^1$ secured to the side walls of the cabinet.

J, denotes a plurality of leaf springs secured to the front and back walls of the cabinet adapted to act upon the movable frames to force them from the front to the back of the cabinet and back again to the front of the cabinet as they are successively brought into position in front of the respective windows. The springs J may be provided with auxiliary springs $J^1$ to assist in moving the frames as they are brought into position to be shifted laterally from one side of the cabinet to the other.

$D^e$, $D^e$, indicate pairs of cam-shaped lugs respectively secured to the upright members $D^a$ and $D^f$ of the vertically movable frames D. The cam lugs $D^e D^e$ secured to the respective vertically movable frames and reciprocating therewith co-ordinate with the springs J to insure a positive lateral movement of the frames H when the rollers $H^a$ of the latter register with the guide-ways $I^1$, $I^a$, upon the frames reaching the limit of their up or down movement.

$D^{aa}$ is an upright bar spaced from the bar $D^a$ and attached to the horizontal members $d$ $d$ of the vertically movable frame,—receiving between them the track or guide ways $C^{aa}$.

As indicated in Figure 2 the springs at the top and back of the cabinet are designed to urge the frames (not shown) toward the front of the cabinet, while those below are designed to urge the lower tier of frames toward the rear of the cabinet.

To provide against the displacement of the frames H while momentarily positioned in front of the windows, spring dogs K— see Figure 7—supported in the end walls of the cabinet are adapted to overlap the rollers $H^a$ of the movable frames to prevent any accidental retrograde movement of the latter.

Having indicated the several parts by reference letters the construction and operation of the device will be readily understood.

A plurality of removable frames H are first filled with photographs or advertising cards placed back to back so that each side of the frame may display a picture or advertisement. The cover $A^1$ of the cabinet is then raised and the strips $C^a$ removed that the rollers of the frames H may enter the vertical ways formed by the guide strips I.

Having provided two tiers of frames one above the other extending from front to back of the cabinet—the strips $C^a$ are replaced and the cover $A^1$ restored to its normal position. A sufficient number of frames having been lodged within the cabinet it will be seen that the outer frames,— or those adjacent to the windows—will be engaged by the spring dogs $D^b$, of the vertically movable frames, entering the apertures $h$ in the frames while the springs J, bearing upon the frames will urge them from one side of the cabinet to the other.

It will be assumed that the motor is now in operation and that the crank-arms G,— actuated through the movement of the gears F,—engaging the movable frames D will operate the latter in alternate directions,— thereby shifting the outer frame H at the top of the cabinet downwardly while forcing the lower frame H on the lower opposite side of the cabinet upwardly in position to again display the cards carried thereby through the respective windows.

Each tier or group of frames is shifted laterally from one side of the cabinet toward the other through the action of the cam-shaped lugs D^e, D^e co-ordinating with the springs J and J^1 following the operation of the motor as the rollers of the respective frames register with the lateral openings I^a provided in the strips I forming the vertical guide-ways.

As before explained,—upon the frames being properly positioned in front of the windows the spring dogs K will overlap the rollers on each end of the frame to prevent any accidental retrograde movement of the latter.

It will be understood in filling the cabinet with the movable frames containing the photographs they are first inserted one by one until the lower and upper tiers are filled,— it however will be obvious that in order to bring the pictures into view in regular sequence space must be provided to receive the frame about to be shifted,—therefore while the space between the walls of the frame is sufficient to accommodate for example fifteen frames in each row or thirty frames altogether only twenty-eight frames are lodged in the cabinet thus providing space for the intermittent movement of the entire number of frames in regular rotation.

The lateral openings I^a in the vertical strips I, are irregularly spaced to conform to the irregular spacing of the rollers H^a at the upper and lower edges of the photo frames H:—the purpose of the irregular spacing is to insure against the outer frames of the top and bottom tiers entering the lateral openings I^a in the vertical strips as they are forced up or down in front of the windows until they actually register with the proper corresponding lateral openings.

Having thus described my invention what I claim is:

1. In a device of the character described, a cabinet provided with window openings in its front and rear walls, a pair of vertically movable frames, means for guiding the respective frames adjacent the front and rear window openings of the cabinet, a prime mover located within the cabinet, a train of gears actuated by said prime mover, crank arms actuated by said gears adapted to alternately and simultaneously raise and lower the respective vertically movable frames, a plurality of removable frames each adapted to receive a pair of advertising cards or the like, means carried by the vertically movable frames adapted to engage the removable photograph or advertising card frames, whereby they may be brought in front of the respective window openings and withdrawn therefrom and means for urging the removable photograph or advertising card frames laterally from the front of the cabinet to the rear of the latter and back to the front of the frame, whereby the advertising cards or the like, carried by said frames may be successively viewed through the front and rear windows of the cabinet.

2. In a device of the character described, a cabinet provided with window openings in its front and rear walls, a pair of vertically movable frames, means for guiding the respective frames adjacent the front and rear window openings of the cabinet, a prime mover located within the cabinet, a train of gears actuated by said prime mover, crank arms actuated by said gears adapted to alternately and simultaneously raise and lower the respective vertically movable frames, a plurality of removable frames each adapted to receive a pair of advertising cards or the like, spring actuated dogs carried by the vertically movable frames adapted to engage the removable photograph or advertising card frames, whereby they may be brought in front of the respective window openings and withdrawn therefrom, and means for urging the removable photograph or advertising card frames laterally from the front of the cabinet to the rear of the latter and back to the front of the frame, whereby the advertising cards or the like, carried by said frames may be successively viewed through the front and rear windows of the cabinet.

3. In a device of the character described, a cabinet provided with window openings in its front and rear walls, a pair of vertically movable frames, means for guiding the respective frames adjacent the front and rear window openings of the cabinet, a prime mover located within the cabinet, a train of gears actuated by said prime mover, crank arms actuated by said gears adapted to alternately and simultaneously raise and lower the respective vertically movable frames, a plurality of removable frames each adapted to receive a pair of advertising cards or the like, means carried by the vertically movable frames adapted to engage the removable photograph or advertising card frames, whereby they may be brought in front of the respective window openings and withdrawn therefrom, and a plurality of resilient elements for urging the removable photograph or advertising card frames laterally from the front of the cabinet to the rear of the latter and back to the front of the frame, whereby the advertising cards or the like, carried by said frames may be successively viewed through the front and rear windows of the cabinet.

4. In a device of the character described, a cabinet provided with window openings in its front and rear walls, a pair of vertically movable frames, means for guiding the respective frames adjacent the front and rear window openings of the cabinet, a prime mover located within the cabinet, a train of gears actuated by said prime mover, crank arms actuated by said gears adapted to alternately and simultaneously raise and lower the respective vertically movable frames, a plurality of removable frames each adapted to receive a pair of advertising cards or the like, means carried by the vertically movable frames adapted to engage the removable photograph or advertising card frames, whereby they may be brought in front of the respective window openings and withdrawn therefrom, and means comprising a plurality of resilient elements adapted to bear upon said removable photograph or advertising card frames, and cam-shaped lugs carried by the vertically movable frames adapted to co-ordinate with said resilient elements to urge said photograph or advertising card frames laterally between the walls of the cabinet, whereby the advertising cards or the like, carried by said frames may be successively viewed through the front and rear windows of the cabinet.

5. In a device of the character described, a cabinet provided with window openings in its front and rear walls, a pair of vertically movable frames, means for guiding the respective frames adjacent the front and rear window openings of the cabinet, a prime mover located within the cabinet, a train of gears actuated by said prime mover, crank arms actuated by said gears adapted to alternately and simultaneously raise and lower the respective vertically movable frames, a plurality of removable frames each adapted to receive a pair of advertising cards or the like, means carried by the vertically movable frames adapted to engage the removable photograph or advertising card frames, whereby they may be brought in front of the respective window openings and withdrawn therefrom, means for locking said frames when adjacent said window-opening against a retrograde movement, and a plurality of resilient elements for urging the removable photograph or advertising card frames laterally from the front of the cabinet to the rear of the latter and back to the front of the frame, whereby the advertising cards or the like, carried by said frames may be successively viewed through the front and rear windows, of the cabinet.

6. In a device of the character described, a cabinet provided with window openings in its front and rear walls, a pair of vertically movable frames, means for guiding the respective frames adjacent the front and rear window openings of the cabinet, a prime mover located within the cabinet, a train of gears actuated by said prime mover, crank arms actuated by said gears adapted to alternately and simultaneously raise and lower the respective vertically movable frames, a plurality of removable frames each adapted to receive a pair of advertising cards or the like, means carried by the vertically movable frames adapted to engage the removable photograph or advertising card frames, whereby they may be brought in front of the respective window openings and withdrawn therefrom, a plurality of spring actuated dogs supported in the wall of the cabinet adapted to engage the frames when adjacent the window-opening to insure against retrograde movement, and a plurality of resilient elements for urging the removable photograph or advertising card frames laterally from the front of the cabinet to the rear of the latter and back to the front of the frame, whereby the advertising cards or the like, carried by said frames may be successively viewed through the front and rear windows of the cabinet.

7. In a device of the character described, a cabinet provided with window openings in opposite walls thereof, a plurality of movable frames to receive matter to be displayed therein, vertical and horizontal guide ways within the cabinet provided with vertical and horizontal passages, a plurality of movable frames slidably mounted within the cabinet having rollers adapted to project into said vertical and horizontal passageways and registerable with the horizontal passage-ways when the frames are opposite the window openings, whereby the movable frames are guided laterally toward said window openings as well as vertically when adjacent the window openings, means for simultaneously shifting a movable frame from a position adjacent one of the openings and at the same time urging another movable frame to displaying position adjacent another opening, resilient means for urging the remaining frames laterally toward the respective window openings and means adapted to prevent accidental retrograde movement of the movable frames.

In testimony whereof, I sign this specification in the presence of two witnesses.

HARRY ROTH.

Witnesses:
S. E. THOMAS,
MAURICE WOLF.